United States Patent
Zhang et al.

(10) Patent No.: US 12,309,864 B2
(45) Date of Patent: May 20, 2025

(54) RESOURCE ALLOCATION METHOD, TERMINAL, NETWORK DEVICE AND COMPUTER STORAGE MEDIUM

(71) Applicants: China Mobile Communication Co., Ltd Research Institute, Beijing (CN); China Mobile Communications Group Co.,Ltd., Beijing (CN)

(72) Inventors: Xiaoran Zhang, Beijing (CN); Nan Li, Beijing (CN); Nan Hu, Beijing (CN); Zhe Shao, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 58 days.

(21) Appl. No.: 17/267,297

(22) PCT Filed: Jul. 16, 2019

(86) PCT No.: PCT/CN2019/096081
§ 371 (c)(1),
(2) Date: Feb. 9, 2021

(87) PCT Pub. No.: WO2020/029756
PCT Pub. Date: Feb. 13, 2020

(65) Prior Publication Data
US 2021/0321476 A1    Oct. 14, 2021

(30) Foreign Application Priority Data
Aug. 9, 2018    (CN) .......................... 201810904638.6

(51) Int. Cl.
*H04W 76/16* (2018.01)
*H04B 1/3827* (2015.01)
(Continued)

(52) U.S. Cl.
CPC .......... *H04W 76/16* (2018.02); *H04B 1/3838* (2013.01); *H04L 5/1423* (2013.01);
(Continued)

(58) Field of Classification Search
CPC ..... H04W 76/16; H04W 8/24; H04W 52/365; H04W 72/1268; H04W 52/367;
(Continued)

(56) References Cited

U.S. PATENT DOCUMENTS

2015/0271811 A1    9/2015   Kim et al.
2017/0318546 A1    11/2017  Suzuki et al.
(Continued)

FOREIGN PATENT DOCUMENTS

CN    106332315 A    1/2017
CN    106550460 A    3/2017
(Continued)

OTHER PUBLICATIONS

Eericsson "Configured Output Power for EN-DC", TSG-RAN Working Group 4 (Radio), Meeting #87, R4-1806725 Busan, South Korea, May 21-25, 2018.
(Continued)

*Primary Examiner* — Jianye Wu
(74) *Attorney, Agent, or Firm* — Price Heneveld LLP

(57) ABSTRACT

A resource allocation method, a terminal, a network device and a computer storage medium are provided. The resource allocation method includes: transmitting, by a terminal, first indication information and/or second indication information to a network device, wherein the first indication information includes a power class type for a band combination of the terminal, the second indication information includes a capability corresponding to the band combination.

20 Claims, 4 Drawing Sheets

(51) Int. Cl.
*H04L 5/14* (2006.01)
*H04W 8/24* (2009.01)
*H04W 52/36* (2009.01)
*H04W 72/1268* (2023.01)

(52) U.S. Cl.
CPC ............. *H04L 5/1469* (2013.01); *H04W 8/24* (2013.01); *H04W 52/365* (2013.01); *H04W 72/1268* (2013.01)

(58) Field of Classification Search
CPC ..... H04W 52/38; H04W 72/21; H04W 72/23; H04B 1/3838; H04L 5/1423; H04L 5/1469; H04L 5/001; H04L 5/0091
See application file for complete search history.

(56) References Cited

U.S. PATENT DOCUMENTS

| | | | | |
|---|---|---|---|---|
| 2018/0279348 | A1* | 9/2018 | Huang | .................. H04W 76/27 |
| 2019/0373452 | A1 | 12/2019 | Huang et al. | |
| 2020/0213066 | A1 | 7/2020 | Ma et al. | |
| 2021/0204227 | A1* | 7/2021 | Bergljung | ............. H04W 52/34 |

FOREIGN PATENT DOCUMENTS

| | | |
|---|---|---|
| CN | 107666690 A | 2/2018 |
| CN | 107980234 A | 5/2018 |
| CN | 109391935 A | 2/2019 |
| EP | 3217730 A1 | 9/2017 |
| WO | 2016072382 A1 | 5/2016 |
| WO | 2017197096 A1 | 11/2017 |

OTHER PUBLICATIONS

"Discussion on Solutions to Satisfy SAR Requirements for NR HPUE", 3GPP TSG-RAN WG4, Meeting #86bis, R4-1804016, Melbourne, AU, Apr. 16-20, 2018.
OPPO "More on HPUE Behavior", 3GPP TSG-RAN WG4, Meeting #87, R4-1806818, Busan, Korea, May 21-25, 2018.
RAN4 "LS Reply to Subcarrier Alignment",3GPP TSG-RAN WG4 Meeting #84bis, R4-1711859, Dubrovnik, Croatia, Oct. 9-13, 2017.
Ericsson, "Power sharing and power class for EN-DC in FR1," TSG-RAN Working Group 4 (Radio) meeting #86bis, Melbourne, Australia, Apr. 16-20, 2018, R4-1804259 (5 pages).
CMCC, "Discussion on SAR evaluation period for NR HPUE," 3GPP TSG-RAN WG4 Meeting #87, Busan, KR, May 21-25, 2018, R4-1806890 (2 pages).
RAN WG4, "LS on the UE capability of maxUplinkDutyCycle for NR FR1 power class 2 UE", 3GPP TSG-RAN WG4 Meeting #86bis, R4-1805786, Melbourne, AU, Apr. 16-20, 2018.

* cited by examiner

RESOURCE ALLOCATION METHOD, TERMINAL, NETWORK DEVICE AND COMPUTER STORAGE MEDIUM

CROSS-REFERENCE TO RELATED APPLICATION

The present application is the U.S. national phase of PCT Application No. PCT/CN2019/096081 filed on Jul. 16, 2019, which claims a priority to the Chinese patent application No. 201810904638.6 filed in China on Aug. 9, 2018, a disclosure of which is incorporated herein by reference in its entirety.

TECHNICAL FIELD

The present disclosure relates to the field of wireless communication technology, in particular to a resource allocation method, a terminal, a network device and a computer storage medium.

BACKGROUND

Specific absorption percentage (SAR) refers to electromagnetic radiation energy absorbed by a unit mass of a substance per unit time. Generally, the SAR value is used globally to measure thermal effects of radiations of a terminal, and also represents effects of radiation on human body. The lower the SAR value, the less radiation is absorbed. Various countries or regions have formulated corresponding mandatory regulations on the SAR value, which have to be satisfied during a terminal admittance testing. China, Japan and European Union adopt the same standard, i.e., an SAR upper limit of 2.0 w/kg over 10 g of any substance; while United States, Republic of Korean and Australia adopt the Institute of Electrical and Electronics Engineers (IEEE) standard, i.e., an SAR upper limit of 1.6 w/kg over 10 g of any substance.

In the phase of long term evolution (LTE), a high power terminal, namely a terminal with power of 26 dBm, is defined for the Band 41 (2496-2690 MHz), and this type of terminals are defined as power class (PC) 2. Since regions, such as the north America, adopt a more stringent SAR target, considering that the SAR requirement cannot be met if the uplink slot percentage is high, terminal manufacturers have proposed a limitation on the time division duplexing (TDD) uplink (UL)/downlink (DL) configuration available to the high power terminals in the standard, so as to meet the regulatory requirements of U.S. Federal Communications Commission (FCC).

When the LTE related standard is formulated, on the one hand, the foreseeable service types are not based on the presumption that a quantity of UL slots is higher than a quantity of DL slots; on the other hand, the related standard requires mandatorily that a Band 41 high power terminal is not allowed to operate with a configuration of a high UL slot percentage (e.g., a UL slot percentage greater than 50%). Moreover, in the LTE era, only a single-frequency-band high power terminal is supported, and a high power terminal with multiple aggregated UL bands is not introduced.

In a 5G network, there are more varied terminal types. Not only there are demands for the single-frequency-band high power terminals, but also there are demands for UL high power in a non-standalone EN-DC (LTE and new radio (NR) dual connectivity) scenario or in a carrier aggregation (CA)/dual connectivity (DC)/supplementary uplink (SUL) scenario supporting uplink aggregation. For these aggregation scenarios, the problem of how to meet the SAR requirement if the total transmit power of the terminal exceeds 23 dBm needs to be addressed. In the meantime, a flexible frame structure is introduced and no fixed TDD percentage exists in NR. A limitation on the high power usage of NR would adversely impacts the flexibility of NR. As for an aggregation scenario, particularly a cross-band, cross-RAT aggregation scenario, the SAR radiation behaviors of two bands may be different from each other, and there is no effective solution to the problem of how to schedule high power transmission of a terminal while meeting SAR requirements in the related art.

SUMMARY

In order to solve the technical problem in the related art, embodiments of the present disclosure provide a resource allocation method, a terminal, a network device and a computer storage medium.

An embodiment of the present disclosure provides a resource allocation method. The method includes: transmitting, by a terminal, first indication information and/or second indication information to a network device, wherein the first indication information includes a power class type for a band combination of the terminal, the second indication information includes a capability corresponding to the band combination.

In the foregoing solution, the band combination of the terminal includes supporting at least one of: a carrier aggregation, a dual connectivity, a multi-RAT dual connectivity, a supplementary uplink (SUL).

In the foregoing solution, the multi-RAT dual connectivity is an EN-DC.

In the foregoing solution, the second indication information includes at least one of following information for the band combination under a condition that a required electromagnetic radiation specific absorption percentage (SAR) limit is met: an overall maximum percentage of uplink that can be scheduled for uplink transmission during a first evaluation period; a combination of percentages of uplink that can be scheduled or transmitted during a first evaluation period; the combination of percentages of uplink that can be scheduled or transmitted during a first evaluation period and a granularity of the percentage of uplink; an identifier of the combination of percentages of uplink that can be scheduled or transmitted during a first evaluation period; a combination of maximum percentages of uplink that can be scheduled or transmitted during a first evaluation period; the combination of the percentage of uplink that can be scheduled or transmitted during a first evaluation period on a secondary carrier or a second RAT carrier in a case that a TDD uplink-downlink configuration is one of 0 to 6 configurations for a primary carrier or a first RAT or FDD; the combination of the percentage of uplink that can be scheduled or transmitted during a first evaluation period on the secondary carrier or the second RAT carrier in the case that the TDD uplink-downlink configuration is one of 0 to 6 configurations for the primary carrier or the first RAT or FDD and a granularity of the percentage of uplink; an identifier of the combination of the percentage of uplink that can be scheduled or transmitted during a first evaluation period on the secondary carrier or the second RAT carrier in the case that the TDD uplink-downlink configuration is one of 0 to 6 configurations for the primary carrier or the first RAT or FDD; a maximum percentage of uplink that can be scheduled or transmitted during a first evaluation period on the secondary carrier or the second RAT carrier in the case that the TDD uplink-downlink configuration is one of 0 to 6 configurations for the primary carrier or the first RAT or FDD; a maximum percentage of uplink that can be scheduled or transmitted during a first evaluation period on the secondary carrier or the second RAT carrier in the case that the TDD uplink-downlink configuration is 1 for the primary carrier or the first RAT or FDD; a maximum percentage of uplink that can be scheduled or transmitted during a first evaluation period on the secondary carrier or the second RAT carrier in the case that the TDD uplink-downlink configuration is neither 0 nor 6 for the primary carrier or the first RAT or FDD; a maximum percentage of uplink that can be scheduled or transmitted during a first evaluation period on the secondary carrier or the second RAT carrier in a case that the terminal has a TDD first uplink-downlink configuration for the primary carrier or the first RAT.

In the foregoing solution, the method further includes: receiving, by the terminal, third indication information from the network device, wherein the third indication information includes uplink-downlink configuration information.

In the foregoing solution, a maximum percentage of uplink that can be scheduled or transmitted during a first evaluation period in NR is determined based on the uplink-downlink configuration information.

In the foregoing solution, the uplink-downlink configuration information includes: uplink-downlink configuration information of at least one primary carrier or first RAT cell and uplink-downlink configuration information of at least one secondary carrier or second RAT cell in a case that the terminal has a multi-RAT dual connectivity; or, uplink-downlink configuration information of at least two carriers or cells in a case that the terminal has a carrier aggregation, a dual connectivity or an SUL.

In the foregoing solution, the receiving, by the terminal, the third indication information from the network device includes: receiving, by the terminal, broadcast information carrying the third indication information; or, receiving, by the terminal, dedicated signaling carrying the third indication information.

In the foregoing solution, the receiving, by the terminal, the dedicated signaling carrying the third indication information includes: receiving, by the terminal, first dedicated signaling carrying the third indication information, wherein the third indication information is used to inform the terminal of uplink-downlink configuration information of a newly added secondary carrier or secondary cell; or receiving, by the terminal, second dedicated signaling carrying the third indication information, wherein the third indication information is used to inform the terminal of uplink-downlink configuration information of a handover target cell.

In the foregoing solution, the method further includes: receiving, by the terminal, fourth indication information from the network device, wherein the fourth indication information includes power headroom report (PHR) configuration information, the PHR configuration information includes PHR report configuration information for a case where the terminal has an inter-RAT dual connectivity, or includes PHR report configuration information for a case where the terminal has a carrier aggregation, dual connectivity.

In the foregoing solution, the method further includes: transmitting, by the terminal, fifth indication information to a network based on the PHR configuration information, wherein the fifth indication information includes a power headroom report (PHR) for the band combination of the terminal.

In the foregoing solution, the PHR report configuration information for a case where the terminal has a multi-RAT dual connectivity includes at least one of following configuration information: whether to report a PHR for an LTE network to the LTE network; whether to report a PHR for an NR network to the NR network; whether to report a PHR for an NR network to an LTE network; whether to report a PHR for an LTE network to an NR network.

In the foregoing solution, the PHR included by the fifth indication information includes at least one of: a PHR for an LTE network reported to the LTE network; a PHR for an NR network reported to the NR network; a PHR for an NR network reported to an LTE network; a PHR for an LTE network reported to an NR network.

In the foregoing solution, the method further includes: controlling, by the terminal, to perform a power back-off or lower a power class in a case that an uplink transmission by the terminal or an uplink transmission scheduled for the terminal exceeds an uplink transmission capability of the terminal during a second evaluation period.

In the foregoing solution, the method further includes: calculating, by the terminal, a maximum output power configurable for the terminal in a serving cell based on a power after the power back-off is performed or the power class is lowered.

In the foregoing solution, the method further includes: transmitting, by the terminal, updated fifth indication information to the network device, wherein the updated fifth indication information includes an updated maximum transmission power or power class.

In the foregoing solution, the combination of percentages of uplink indicates whether uplink percentages of aggregated carriers in the band combination are supported under the condition that the required electromagnetic radiation SAR limit is met; the granularity of the percentage of uplink indicates a percentage interval between uplink percentages of an aggregated carrier in the band combination; the identifier of the combination of percentages of uplink indicates an identifier of information corresponding to the combination of percentages of uplink, wherein the information corresponding to the combination of percentages of uplink is preconfigured in the terminal.

An embodiment of the present disclosure further provides a resource allocation method. The method includes: receiving, by a network device, first indication information and/or second indication information from a terminal, wherein the first indication information includes a power class type for a band combination of the terminal, the second indication information includes a capability corresponding to the band combination; scheduling, by the network device, uplink transmission by the terminal based on the first indication information and/or the second indication information.

In the foregoing solution, the band combination of the terminal includes supporting at least one of: a carrier aggregation, a dual connectivity, a multi-RAT dual connectivity, an SUL.

In the foregoing solution, the multi-RAT dual connectivity is an EN-DC.

In the foregoing solution, the second indication information includes at least one of following information for the band combination under a condition that a required electromagnetic radiation specific absorption percentage (SAR) limit is met: an overall maximum percentage of uplink that can be scheduled for uplink transmission during a first evaluation period; a combination of percentages of uplink that can be scheduled or transmitted during a first evaluation period; the combination of percentages of uplink that can be scheduled or transmitted during a first evaluation period and a granularity of the percentage of uplink; an identifier of the combination of percentages of uplink that can be scheduled or transmitted during a first evaluation period; a combination of maximum percentages of uplink that can be scheduled or transmitted during a first evaluation period; the combination of the percentage of uplink that can be scheduled or transmitted during a first evaluation period on a secondary carrier or a second RAT carrier in a case that a TDD uplink-downlink configuration is one of 0 to 6 configurations for a primary carrier or a first RAT or FDD; the combination of the percentage of uplink that can be scheduled or transmitted during a first evaluation period on the secondary carrier or the second RAT carrier in the case that the TDD uplink-downlink configuration is one of 0 to 6 configurations for the primary carrier or the first RAT or FDD and a granularity of the percentage of uplink; an identifier of the combination of the percentage of uplink that can be scheduled or transmitted during a first evaluation period on the secondary carrier or the second RAT carrier in the case that the TDD uplink-downlink configuration is one of 0 to 6 configurations for the primary carrier or the first RAT or FDD; a maximum percentage of uplink that can be scheduled or transmitted during a first evaluation period on the secondary carrier or the second RAT carrier in the case that the TDD uplink-downlink configuration is one of 0 to 6 configurations for the primary carrier or the first RAT or FDD; a maximum percentage of uplink that can be scheduled or transmitted during a first evaluation period on the secondary carrier or the second RAT carrier in the case that the TDD uplink-downlink configuration is 1 for the primary carrier or the first RAT or FDD; a maximum percentage of uplink that can be scheduled or transmitted during a first evaluation period on the secondary carrier or the second RAT carrier in the case that the TDD uplink-downlink configuration is neither 0 nor 6 for the primary carrier or the first RAT or FDD; a maximum percentage of uplink that can be scheduled or transmitted during a first evaluation period on the secondary carrier or the second RAT carrier in a case that the terminal has a TDD first uplink-downlink configuration for the primary carrier or the first RAT.

In the foregoing solution, the method further includes: transmitting, by the network device, third indication information to the terminal, wherein the third indication information includes uplink-downlink slot configuration information.

In the foregoing solution, the uplink-downlink slot configuration information includes: uplink-downlink configuration information of at least one primary carrier or first RAT cell and uplink-downlink slot configuration information of at least one secondary carrier or second RAT cell in a case that the terminal has a multi-RAT dual connectivity; or, uplink-downlink configuration information of at least two carriers or cells in a case that the terminal has a carrier aggregation, a dual connectivity or an SUL.

In the foregoing solution, the transmitting, by the network device, the third indication information to the terminal includes: transmitting, by the network device, the third indication information to the terminal via broadcast information; or, transmitting, by the network device, the third indication information to the terminal via dedicated signaling.

In the foregoing solution, the transmitting, by the network device, the third indication information to the terminal via the dedicated signaling includes: transmitting, by the network device, the third indication information to the terminal via first dedicated signaling, wherein the third indication information is used to inform the terminal of uplink-downlink configuration information of a newly added secondary carrier or secondary cell; or, transmitting, by the network device, the third indication information to the terminal via second dedicated signaling, wherein the third indication information is used to inform the terminal of uplink-downlink configuration information of a handover target cell.

In the foregoing solution, the method further includes: transmitting, by the network device, fourth indication information to the terminal, wherein the fourth indication information includes power headroom report (PHR) configuration information, the PHR configuration information includes PHR report configuration information for a case where the terminal has an inter-RAT dual connectivity, or includes PHR report configuration information for a case where the terminal has a carrier aggregation, dual connectivity.

In the foregoing solution, the PHR report configuration information for a case where the terminal has an inter-RAT dual connectivity includes at least one of following configuration information: whether to report a PHR for an LTE network to the LTE network; whether to report a PHR for an NR network to the NR network; whether to report a PHR for an NR network to an LTE network; whether to report a PHR for an LTE network to an NR network.

In the foregoing solution, the method further includes: receiving, by the network device, fifth indication information from the terminal, wherein the fifth indication information includes a PHR for the band combination of the terminal.

In the foregoing solution, the scheduling, by the network device, the uplink transmission by the terminal based on the first indication information and/or the second indication information includes: scheduling, by the network device, the uplink transmission by the terminal based on at least one of the first indication information, the second indication information and third indication information.

In the foregoing solution, the scheduling, by the network device, the uplink transmission by the terminal based on at least one of the first indication information, the second indication information and the third indication information includes: allocating, by the network device, an uplink resource to the terminal based on at least one of the first indication information, the second indication information and the third indication information, and transmitting, by the network device, resource scheduling information of the uplink resource to the terminal.

In the foregoing solution, the combination of percentages of uplink indicates whether uplink percentages of aggregated carriers in the band combination are supported under the condition that the required electromagnetic radiation SAR limit is met; the granularity of the percentage of uplink indicates a percentage interval between uplink percentages of an aggregated carrier in the band combination; the identifier of the combination of percentages of uplink indicates an identifier of information corresponding to the combination of percentages of uplink, wherein the information corresponding to the combination of percentages of uplink is preconfigured in the terminal.

An embodiment of the present disclosure further provides a terminal. The terminal includes: a first transmission unit, configured to transmit first indication information and/or second indication information to a network device, wherein the first indication information includes a power class type for a band combination of the terminal, the second indication information includes a capability corresponding to the band combination.

In the foregoing solution, the band combination of the terminal includes supporting at least one of: a carrier aggregation, a dual connectivity, a multi-RAT dual connectivity, an SUL.

In the foregoing solution, the multi-RAT dual connectivity is an EN-DC.

In the foregoing solution, the second indication information includes at least one of following information for the band combination under a condition that a required electromagnetic radiation specific absorption percentage (SAR) limit is met: an overall maximum percentage of uplink that can be scheduled for uplink transmission during a first evaluation period; a combination of percentages of uplink that can be scheduled or transmitted during a first evaluation period; the combination of percentages of uplink that can be scheduled or transmitted during a first evaluation period and a granularity of the percentage of uplink; an identifier of the combination of percentages of uplink that can be scheduled or transmitted during a first evaluation period; a combination of maximum percentages of uplink that can be scheduled or transmitted during a first evaluation period; the combination of the percentage of uplink that can be scheduled or transmitted during a first evaluation period on a secondary carrier or a second RAT carrier in a case that a time division duplexing (TDD) uplink-downlink configuration is one of 0 to 6 configurations for a primary carrier or a first RAT or FDD; the combination of the percentage of uplink that can be scheduled or transmitted during a first evaluation period on the secondary carrier or the second RAT carrier in the case that the TDD uplink-downlink configuration is one of 0 to 6 configurations for the primary carrier or the first RAT or FDD and a granularity of the percentage of uplink; an identifier of the combination of the percentage of uplink that can be scheduled or transmitted during a first evaluation period on the secondary carrier or the second RAT carrier in the case that the TDD uplink-downlink configuration is one of 0 to 6 configurations for the primary carrier or the first RAT or FDD; a maximum percentage of uplink that can be scheduled or transmitted during a first evaluation period on the secondary carrier or the second RAT carrier in the case that the TDD uplink-downlink configuration is one of 0 to 6 configurations for the primary carrier or the first RAT or FDD; a maximum percentage of uplink that can be scheduled or transmitted during a first evaluation period on the secondary carrier or the second RAT carrier in the case that the TDD uplink-downlink configuration is 1 for the primary carrier or the first RAT or FDD; a maximum percentage of uplink that can be scheduled or transmitted during a first evaluation period on the secondary carrier or the second RAT carrier in the case that the TDD uplink-downlink configuration is neither 0 nor 6 for the primary carrier or the first RAT or FDD; a maximum percentage of uplink that can be scheduled or transmitted during a first evaluation period on the secondary carrier or the second RAT carrier in a case that the terminal has a TDD first uplink-downlink configuration for the primary carrier or the first RAT.

In the foregoing solution, the terminal further includes a first reception unit, configured to receive third indication information from the network device, wherein the third indication information includes uplink-downlink configuration information.

In the foregoing solution, a maximum percentage of uplink that can be scheduled or transmitted during a first evaluation period in NR is determined based on the uplink-downlink configuration information.

In the foregoing solution, the uplink-downlink configuration information includes: uplink-downlink configuration information of at least one primary carrier or first RAT cell and uplink-downlink configuration information of at least one secondary carrier or second RAT cell in a case that the terminal has a multi-RAT dual connectivity; or, uplink-downlink configuration information of at least two carriers or cells in a case that the terminal has a carrier aggregation, a dual connectivity or an SUL.

In the foregoing solution, the first reception unit is configured to receive broadcast information carrying the third indication information, or receive dedicated signaling carrying the third indication information.

In the foregoing solution, the first reception unit is configured to: receive first dedicated signaling carrying the third indication information, wherein the third indication information is used to inform the terminal of uplink-downlink configuration information of a newly added secondary carrier or secondary cell; or, receive second dedicated signaling carrying the third indication information, wherein the third indication information is used to inform the terminal of uplink-downlink configuration information of a handover target cell.

In the foregoing solution, the terminal further includes a first reception unit configured to: receive fourth indication information from the network device, wherein the fourth indication information includes PHR configuration information, the PHR configuration information includes PHR report configuration information for a case where the terminal has an inter-RAT dual connectivity, or includes PHR report configuration information for a case where the terminal has a carrier aggregation, dual connectivity.

In the foregoing solution, the first transmission unit is further configured to transmit fifth indication information to a network based on the PHR configuration information, wherein the fifth indication information includes a PHR for the band combination of the terminal.

In the foregoing solution, the PHR report configuration information for a case where the terminal has a multi-RAT dual connectivity includes at least one of following configuration information: whether to report a PHR for an LTE network to the LTE network; whether to report a PHR for an NR network to the NR network; whether to report a PHR for an NR network to an LTE network; whether to report a PHR for an LTE network to an NR network.

In the foregoing solution, the PHR included by the fifth indication information includes at least one of: a PHR for an LTE network reported to the LTE network; a PHR for an NR network reported to the NR network; a PHR for an NR network reported to an LTE network; a PHR for an LTE network reported to an NR network.

In the foregoing solution, the terminal further includes a control unit configured to: control to perform a power back-off or lower a power class in a case that an uplink transmission by the terminal or an uplink transmission scheduled for the terminal exceeds an uplink transmission capability of the terminal during a second evaluation period.

In the foregoing solution, the control unit is further configured to: calculate a maximum output power configurable for the terminal in a serving cell based on a power after the power back-off is performed or the power class is lowered.

In the foregoing solution, the first transmission unit is further configured to: transmit updated fifth indication information to the network device, wherein the updated fifth indication information includes an updated maximum transmission power or power class.

In the foregoing solution, the combination of percentages of uplink indicates whether uplink percentages of aggregated carriers in the band combination are supported under the condition that the required electromagnetic radiation SAR limit is met; the granularity of the percentage of uplink indicates a percentage interval between uplink percentages of an aggregated carrier in the band combination; the identifier of the combination of percentages of uplink indicates an identifier of information corresponding to the combination of percentages of uplink, wherein the information corresponding to the combination of percentages of uplink is preconfigured in the terminal.

An embodiment of the present disclosure further provides a network device. The network device includes a second reception unit and a scheduling unit, wherein, the second reception unit is configured to receive first indication information and/or second indication information from a terminal, wherein the first indication information includes a power class type for a band combination of the terminal, the second indication information includes a capability corresponding to the band combination; the scheduling unit is configured to schedule uplink transmission by the terminal based on the first indication information and/or the second indication information.

In the foregoing solution, the band combination of the terminal includes supporting at least one of: a carrier aggregation, a dual connectivity, a multi-RAT dual connectivity, an SUL.

In the foregoing solution, the multi-RAT dual connectivity is an EN-DC.

In the foregoing solution, the second indication information includes at least one of following information for the band combination under a condition that a required electromagnetic radiation specific absorption percentage (SAR) limit is met: an overall maximum percentage of uplink that can be scheduled for uplink transmission during a first evaluation period; a combination of percentages of uplink that can be scheduled or transmitted during a first evaluation period; the combination of percentages of uplink that can be scheduled or transmitted during a first evaluation period and a granularity of the percentage of uplink; an identifier of the combination of percentages of uplink that can be scheduled or transmitted during a first evaluation period; a combination of maximum percentages of uplink that can be scheduled or transmitted during a first evaluation period; the combination of the percentage of uplink that can be scheduled or transmitted during a first evaluation period on a secondary carrier or a second RAT carrier in a case that a TDD uplink-downlink configuration is one of 0 to 6 configurations for a primary carrier or a first RAT or FDD; the combination of the percentage of uplink that can be scheduled or transmitted during a first evaluation period on the secondary carrier or the second RAT carrier in the case that the TDD uplink-downlink configuration is one of 0 to 6 configurations for the primary carrier or the first RAT or FDD and a granularity of the percentage of uplink; an identifier of the combination of the percentage of uplink that can be scheduled or transmitted during a first evaluation period on the secondary carrier or the second RAT carrier in the case that the TDD uplink-downlink configuration is one of 0 to 6 configurations for the primary carrier or the first RAT or FDD; a maximum percentage of uplink that can be scheduled or transmitted during a first evaluation period on the secondary carrier or the second RAT carrier in the case that the TDD uplink-downlink configuration is one of 0 to 6 configurations for the primary carrier or the first RAT or FDD; a maximum percentage of uplink that can be scheduled or transmitted during a first evaluation period on the secondary carrier or the second RAT carrier in the case that the TDD uplink-downlink configuration is 1 for the primary carrier or the first RAT or FDD; a maximum percentage of uplink that can be scheduled or transmitted during a first evaluation period on the secondary carrier or the second RAT carrier in the case that the TDD uplink-downlink configuration is neither 0 nor 6 for the primary carrier or the first RAT or FDD; a maximum percentage of uplink that can be scheduled or transmitted during a first evaluation period on the secondary carrier or the second RAT carrier in a case that the terminal has a TDD first uplink-downlink configuration for the primary carrier or the first RAT.

In the foregoing solution, the network device further includes a second transmission unit, configured to transmit third indication information to the terminal, wherein the third indication information includes uplink-downlink slot configuration information.

In the foregoing solution, the uplink-downlink slot configuration information includes: uplink-downlink configuration information of at least one primary carrier or first RAT cell and uplink-downlink slot configuration information of at least one secondary carrier or second RAT cell in a case that the terminal has a multi-RAT dual connectivity; or, uplink-downlink configuration information of at least two carriers or cells in a case that the terminal has a carrier aggregation, a dual connectivity or an SUL.

In the foregoing solution, the second transmission unit is configured to: transmit the third indication information to the terminal via broadcast information; or, transmit the third indication information to the terminal via dedicated signaling.

In the foregoing solution, the second transmission unit is configured to: transmit the third indication information to the terminal via first dedicated signaling, wherein the third indication information is used to inform the terminal of uplink-downlink configuration information of a newly added secondary carrier or secondary cell; or, transmit the third indication information to the terminal via second dedicated signaling, wherein the third indication information is used to inform the terminal of uplink-downlink configuration information of a handover target cell.

In the foregoing solution, the network device further includes a second transmission unit configured to transmit fourth indication information to the terminal, wherein the fourth indication information includes PHR configuration information, the PHR configuration information includes PHR report configuration information for a case where the terminal has an inter-RAT dual connectivity, or includes PHR report configuration information for a case where the terminal has a carrier aggregation, dual connectivity.

In the foregoing solution, the PHR report configuration information for a case where the terminal has an inter-RAT dual connectivity includes at least one of following configuration information: whether to report a PHR for an LTE network to the LTE network; whether to report a PHR for an NR network to the NR network; whether to report a PHR for an NR network to an LTE network; whether to report a PHR for an LTE network to an NR network.

In the foregoing solution, the second reception unit is further configured to receive fifth indication information from the terminal, wherein the fifth indication information includes a PHR for the band combination of the terminal.

In the foregoing solution, the scheduling unit is configured to schedule the uplink transmission by the terminal based on at least one of the first indication information, the second indication information and third indication information.

In the foregoing solution, the scheduling unit is configured to: allocate an uplink resource to the terminal based on at least one of the first indication information, the second indication information and the third indication information, and transmit resource scheduling information of the uplink resource to the terminal.

In the foregoing solution, the combination of percentages of uplink indicates whether uplink percentages of aggregated carriers in the band combination are supported under the condition that the required electromagnetic radiation SAR limit is met; the granularity of the percentage of uplink indicates a percentage interval between uplink percentages of an aggregated carrier in the band combination; the identifier of the combination of percentages of uplink indicates an identifier of information corresponding to the combination of percentages of uplink, wherein the information corresponding to the combination of percentages of uplink is preconfigured in the terminal.

An embodiment of the present disclosure further provides a computer readable storage medium storing therein a computer program, wherein the computer program is configured to be executed by a processor, to implement steps of the resource allocation method applied to the terminal as described in the embodiment of the present disclosure, or to implement steps of the resource allocation method applied to the network device as described in the embodiment of the present disclosure.

An embodiment of the present disclosure further provides a terminal, including a memory, a processor and a computer program stored in the memory and configured to be executed by the processor, wherein the processor is configured to execute the computer program, to implement steps of the resource allocation method applied to the terminal as described in the embodiment of the present disclosure.

An embodiment of the present disclosure further provides a network device, including a memory, a processor and a computer program stored in the memory and configured to be executed by the processor, wherein the processor is configured to execute the computer program, to implement steps of the resource allocation method applied to the network device as described in the embodiment of the present disclosure.

The embodiments of the present disclosure provide the resource allocation method, the terminal, the network device and the computer storage medium. The method includes: a terminal transmits first indication information and/or second indication information to a network device, wherein the first indication information includes a power class type for a band combination of the terminal, the second indication information includes a capability corresponding to the band combination. The network device receives first indication information and/or second indication information from the terminal, and schedules uplink transmission by the terminal based on the first indication information and/or the second indication information. According to the technical solution of embodiments of the present disclosure, the terminal reports the power class type for the band combination and/or the capability corresponding to the band combination, so that the network device may acquire the power class type for the band combination and/or the capability corresponding to the band combination of the terminal, and properly schedule the uplink transmission by the terminal according to the acquired information under the condition that the required electromagnetic radiation SAR limit is met. The technical solution is particularly applicable to a cross-band, cross-RAT aggregation scenario.

DETAILED DESCRIPTION

The present disclosure is described in further detail with reference to the accompany drawings and specific embodiments hereinafter.

Figure 1:
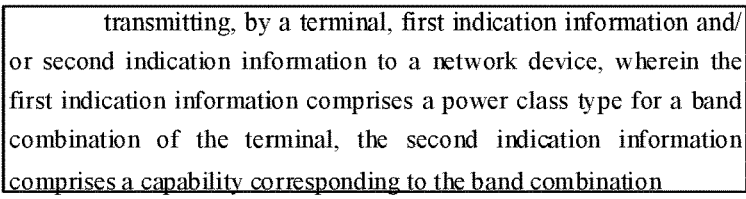
FIG. 1 is a first flow diagram of a resource allocation method according to an embodiment of the present disclosure.

An embodiment of the present disclosure provides a resource allocation method. FIG. 1 is a first flow diagram of the resource allocation method according to the embodiment of the present disclosure. As shown in FIG. 1, the method includes a step 101: transmitting, by a terminal, first indication information and/or second indication information to a network device, wherein the first indication information includes a power class type for a band combination of the terminal, the second indication information includes a capability corresponding to the band combination.

In the embodiment, the band combination of the terminal includes supporting at least one of: a carrier aggregation, a dual connectivity, a multi-RAT dual connectivity, an SUL. The multi-RAT dual connectivity is an EN-DC.

In the embodiment, the first indication information includes a power class type for a band combination of the terminal. The power class types for the band combinations of the terminal are as shown in the following table 1. For a type such as options B, C, F and I, i.e., the type of power class 2 (PC2) with a power of 26 dBm, the terminal needs to report the power class type via the first indication information.

TABLE 1

| Option | EN-DC power class | LTE power class | NR Power class |
|--------|-------------------|-----------------|----------------|
| A | PC3 | PC3 | PC3 |
| B | PC2 | PC2 | PC3 |
| C | PC2 | PC3 | PC2 |
| D | PC3 | PC2 | PC3 |
| E | PC3 | PC3 | PC2 |
| F | PC2 | PC2 | PC2 |

TABLE 1-continued

| Option | EN-DC power class | LTE power class | NR Power class |
|---|---|---|---|
| G | PC3 | PC2 | PC2 |
| I | PC2 | PC3 | PC3 |

In the embodiment, the second indication information includes at least one of following information for the band combination under a condition that a required electromagnetic radiation specific absorption percentage (SAR) limit is met:

- an overall maximum percentage of uplink time that can be scheduled for uplink transmission during a first evaluation period;
- a combination of percentages of uplink time that can be scheduled or transmitted during a first evaluation period;
- the combination of percentages of uplink time that can be scheduled or transmitted during a first evaluation period and a granularity of the percentage of uplink;
- an identifier of the combination of percentages of uplink time that can be scheduled or transmitted during a first evaluation period;
- a combination of maximum percentages of uplink time that can be scheduled or transmitted during a first evaluation period;
- the combination of the percentage of uplink time that can be scheduled or transmitted during a first evaluation period on a secondary carrier or a second RAT carrier in a case that a TDD uplink-downlink configuration is one of 0 to 6 configurations for a primary carrier or a first RAT or FDD;
- the combination of the percentage of uplink time that can be scheduled or transmitted during a first evaluation period on the secondary carrier or the second RAT carrier in the case that the TDD uplink-downlink configuration is one of 0 to 6 configurations for the primary carrier or the first RAT or FDD and a granularity of the percentage of uplink;
- an identifier of the combination of the percentage of uplink time that can be scheduled or transmitted during a first evaluation period on the secondary carrier or the second RAT carrier in the case that the TDD uplink-downlink configuration is one of 0 to 6 configurations for the primary carrier or the first RAT or FDD;
- a maximum percentage of uplink time that can be scheduled or transmitted during a first evaluation period on the secondary carrier or the second RAT carrier in the case that the TDD uplink-downlink configuration is one of 0 to 6 configurations for the primary carrier or the first RAT or FDD;
- a maximum percentage of uplink time that can be scheduled or transmitted during a first evaluation period on the secondary carrier or the second RAT carrier in the case that the TDD uplink-downlink configuration is 1 for the primary carrier or the first RAT or FDD;
- a maximum percentage of uplink time that can be scheduled or transmitted during a first evaluation period on the secondary carrier or the second RAT carrier in the case that the TDD uplink-downlink configuration is neither 0 nor 6 for the primary carrier or the first RAT or FDD;
- a maximum percentage of uplink time that can be scheduled or transmitted during a first evaluation period on the secondary carrier or the second RAT carrier in a case that the terminal has a TDD first uplink-downlink configuration for the primary carrier or the first RAT.
- the combination of percentages of uplink time indicates whether uplink percentages of aggregated carriers in the band combination are supported under the condition that the required electromagnetic radiation SAR limit is met; the granularity of the percentage of uplink indicates a percentage interval between uplink percentages of an aggregated carrier in the band combination; the identifier of the combination of percentages of uplink indicates an identifier of information corresponding to the combination of percentages of uplink time, wherein the information corresponding to the combination of percentages of uplink time is preconfigured in the terminal.

As an implementation, the second indication information includes an overall maximum percentage of uplink time that can be scheduled for uplink transmission during a first evaluation period for the band combination under a condition that a required electromagnetic radiation SAR limit is met. For example, the terminal reports that an overall maximum uplink percentage supported for a combination of band A and band B is 60%.

As an implementation, the second indication information includes a combination of percentages of uplink time that can be scheduled or transmitted during a first evaluation period for the band combination under a condition that a required electromagnetic radiation SAR limit is met. Specifically, table 2 shows whether combinations of percentages of uplink time available for scheduling the terminal on the Band A and Band B are supported, where "1" indicates that the combination is supported, and "0" indicates that the combination is not supported.

TABLE 2

| BandA/Band B | 10% | 20% | 30% | 40% | 50% | 60% | 70% | 80% | 90% |
|---|---|---|---|---|---|---|---|---|---|
| 10% | 1 | 1 | 1 | 1 | 1 | 0 | 0 | 0 | 0 |
| 20% | 1 | 1 | 1 | 1 | 0 | 0 | 0 | 0 | 0 |
| 30% | 1 | 1 | 1 | 0 | 0 | 0 | 0 | 0 | 0 |
| 40% | 1 | 1 | 0 | 0 | 0 | 0 | 0 | 0 | 0 |
| 50% | 1 | 0 | 0 | 0 | 0 | 0 | 0 | 0 | 0 |
| 60% | 0 | 0 | 0 | 0 | 0 | 0 | 0 | 0 | 0 |
| 70% | 0 | 0 | 0 | 0 | 0 | 0 | 0 | 0 | 0 |
| 80% | 0 | 0 | 0 | 0 | 0 | 0 | 0 | 0 | 0 |
| 90% | 0 | 0 | 0 | 0 | 0 | 0 | 0 | 0 | 0 |

As an implementation, the second indication information includes the combination of percentages of uplink that can be scheduled or transmitted during a first evaluation period for the band combination under a condition that a required electromagnetic radiation SAR limit is met and a granularity of the percentage of uplink. For example, referring to the table 2, the table 2 shows combinations of percentages of uplink available for scheduling the terminal or available for transmission by the terminal, and a granularity as shown in table 2 is 10%.

As an implementation, the second indication information includes an identifier of the combination of percentages of uplink that can be scheduled or transmitted during a first evaluation period for the band combination under a condition that a required electromagnetic radiation SAR limit is met. As an example, at least one table as shown in table 2 may be predefined in the terminal, and each table represents a different combination of uplink percentages; in this case, the identifier of the combination of percentages of uplink available for scheduling the terminal or available for transmission by the terminal may specifically be an identifier of the predefined table, in other words, the terminal may only report an identifier of a table, rather than reporting the specific content of the table, thereby significantly reducing data overhead.

As an implementation, the second indication information includes a combination of maximum percentages of uplink that can be scheduled or transmitted during a first evaluation period for the band combination under a condition that a required electromagnetic radiation SAR limit is met. For example, the terminal reports that a maximum uplink percentage combination supported for a combination of band A and band B is: band A 50%, band B 50%.

As an implementation, the second indication information includes the combination of the percentage of uplink that can be scheduled or transmitted during a first evaluation period on a secondary carrier or a second RAT carrier in a case that a TDD uplink-downlink configuration is one of 0 to 6 configurations for a primary carrier or a first RAT or FDD, for the band combination under a condition that a required electromagnetic radiation SAR limit is met. This implementation is applicable to an EN-DC scenario, where the primary carrier or the first RAT corresponds to an LTE network, and a fixed slot percentage is adopted on the LTE network side, that is, the uplink-downlink configuration is one of 0 to 6 configurations; the secondary carrier or the second RAT corresponds to an NR network, and a dynamic uplink-downlink slot percentage is adopted on the NR network side. As an example, referring to the table 3, the table 3 shows whether combinations of percentages of uplink available for scheduling the terminal or available for transmission by the terminal in NR and LTE TDD uplink-downlink configurations of one of 0 to 6 configurations are supported, where "1" indicates that the combination is supported, and "0" indicates that the combination is not supported.

TABLE 3

| LTE/NR | 10% | 20% | 30% | 40% | 50% | 60% | 70% | 80% | 90% |
|---|---|---|---|---|---|---|---|---|---|
| TDD config 0 | 1 | 1 | 1 | 0 | 0 | 0 | 0 | 0 | 0 |
| TDD config 1 | 1 | 1 | 1 | 1 | 0 | 0 | 0 | 0 | 0 |
| TDD config 2 | 1 | 1 | 1 | 1 | 1 | 0 | 0 | 0 | 0 |
| TDD config 3 | 1 | 1 | 1 | 1 | 1 | 1 | 0 | 0 | 0 |
| TDD config 4 | 1 | 1 | 1 | 1 | 1 | 1 | 0 | 0 | 0 |
| TDD config 5 | 1 | 1 | 1 | 1 | 1 | 1 | 0 | 0 | 0 |
| TDD config 6 | 1 | 1 | 1 | 0 | 0 | 0 | 0 | 0 | 0 |

As an implementation, the second indication information includes the combination of the percentage of uplink that can be scheduled or transmitted during a first evaluation period on a secondary carrier or a second RAT carrier in a case that a TDD uplink-downlink configuration is one of 0 to 6 configurations for a primary carrier or a first RAT or FDD and a granularity of the percentage of uplink, for the band combination under a condition that a required electromagnetic radiation SAR limit is met. For example, referring to the table 3, the table 3 shows whether combinations of percentages of uplink available for scheduling the terminal or available for transmission by the terminal in NR and LTE TDD uplink-downlink configurations of one of 0 to 6 configurations are supported, and a granularity of the dynamic uplink-downlink slot percentage adopted on the NR network side as shown in table 3 is 10%.

As an implementation, the second indication information includes an identifier of the combination of the percentage of uplink that can be scheduled or transmitted during a first evaluation period on a secondary carrier or a second RAT carrier in a case that a TDD uplink-downlink configuration is one of 0 to 6 configurations for a primary carrier or a first RAT or FDD, for the band combination under a condition that a required electromagnetic radiation SAR limit is met. As an example, at least one table as shown in table 3 may be predefined in the terminal, and each table represents a different combination of the percentages of uplink available for scheduling the terminal or available for transmission by the terminal in NR and LTE TDD uplink-downlink configurations of one of 0 to 6 configurations; in this case, the identifier of the combination of percentages of uplink available for scheduling the terminal or available for transmission by the terminal may specifically be an identifier of the predefined table, in other words, the terminal may only report an identifier of a table, rather than reporting the specific content of the table, thereby significantly reducing data overhead.

As an implementation, the second indication information includes a maximum percentage of uplink that can be scheduled or transmitted during a first evaluation period on the secondary carrier or the second RAT carrier in the case that the TDD uplink-downlink configuration is one of 0 to 6 configurations for the primary carrier or the first RAT or FDD, for the band combination under a condition that a required electromagnetic radiation SAR limit is met. This implementation is applicable to an EN-DC scenario. For example, referring to table 4, the primary carrier or the first RAT corresponds to an LTE network, and a fixed slot percentage is adopted on the LTE network side, that is, the uplink-downlink configuration is one of 0 to 6 configurations; the secondary carrier or the second RAT corresponds to an NR network, and the NR side maximum uplink percentages corresponding to the LTE network-side uplink-downlink configurations of one of 0 to 6 configurations may be 30%, 50%, 50%, 50%, 50%, 50%, 30% respectively.

TABLE 4

| LTE | NR |
|---|---|
| TDD config 0 | 30% |
| TDD config 1 | 50% |
| TDD config 2 | 50% |
| TDD config 3 | 50% |
| TDD config 4 | 50% |
| TDD config 5 | 50% |
| TDD config 6 | 30% |

As an implementation, the second indication information includes a maximum percentage of uplink that can be scheduled or transmitted during a first evaluation period on the secondary carrier or the second RAT carrier in the case that the TDD uplink-downlink configuration is neither 0 nor 6 for the primary carrier or the first RAT or FDD, for the band combination under a condition that a required electromagnetic radiation SAR limit is met. For example, in a case that the TDD uplink-downlink configuration is neither 0 nor 6 for the primary carrier or the first RAT (i.e., having one of configurations 1 to 5), the terminal reports that the maximum percentage of uplink available for scheduling the terminal or available for transmission by the terminal on the secondary carrier or the second RAT carrier is 50%.

As an implementation, the second indication information includes a maximum percentage of uplink that can be scheduled or transmitted during a first evaluation period on the secondary carrier or the second RAT carrier in a case that the terminal has a TDD first uplink-downlink configuration for the primary carrier or the first RAT, for the band combination under a condition that a required electromagnetic radiation SAR limit is met. This implementation is applicable to an EN-DC scenario, wherein the LTE side adopts a fixed slot percentage and the NR side adopts a dynamic uplink-downlink slot percentage. For example, the primary carrier or the first RAT corresponds to an LTE network, and a fixed slot percentage is adopted on the LTE network side, e.g., the uplink-downlink configuration is any one of one of 0 to 6 configurations; the secondary carrier or the second RAT corresponds to an NR network, and the NR network side adopts a dynamic uplink-downlink slot percentage. For the TDD config 2, the maximum uplink percentage available in NR is 50%.

As an implementation, the second indication information includes a maximum percentage of uplink available for scheduling the terminal within the first time window in NR corresponding to an LTE TDD uplink-downlink configuration 1 (e.g., 50% UL) or FDD, for the band combination under a condition that a required electromagnetic radiation SAR limit is met. This implementation is applicable to an EN-DC scenario. For example, for the TDD config 1, the maximum uplink percentage available in NR is 50%. For another example, for FDD, the maximum uplink percentage available in NR is 25%.

In an embodiment, the method further includes: receiving, by the terminal, third indication information from the network device, wherein the third indication information includes uplink-downlink configuration information.

Here, a maximum percentage of uplink that can be scheduled or transmitted during a first evaluation period in NR which is included in the second indication information is determined based on the uplink-downlink configuration information.

In this implementation, the uplink-downlink configuration information includes: uplink-downlink configuration information of at least one primary carrier or first RAT cell and uplink-downlink configuration information of at least one secondary carrier or second RAT cell in a case that the terminal has a multi-RAT dual connectivity; or, uplink-downlink configuration information of at least two carriers or cells in a case that the terminal has a carrier aggregation, a dual connectivity or an SUL.

As an example, in an EN-DC scenario, the uplink-downlink slot configuration information includes an uplink-downlink slot configuration of the LTE cell and an uplink-downlink slot configuration of the NR cell; as another example, the uplink-downlink slot configuration information includes uplink-downlink slot configurations of multiple carriers/cells in an LTE carrier aggregation or NR carrier aggregation scenario, a DC scenario, or a SUL scenario.

In this implementation, the receiving, by the terminal, the third indication information from the network device includes: receiving, by the terminal, broadcast information carrying the third indication information; or, receiving, by the terminal, dedicated signaling carrying the third indication information. As an example, the third indication information is transmitted via the broadcast information, the broadcast information is for example RAT information block type 1 (SIB1) information, which is applicable to cell selection or reselection and is utilized before network access.

As an implementation, the receiving, by the terminal, the dedicated signaling carrying the third indication information includes: receiving, by the terminal, first dedicated signaling carrying the third indication information, wherein the third indication information is used to inform the terminal of uplink-downlink configuration information of a newly added secondary carrier or secondary cell; or, receiving, by the terminal, second dedicated signaling carrying the third indication information, wherein the third indication information is used to inform the terminal of uplink-downlink configuration information of a handover target cell.

The first dedicated signaling is for example RadioResourceConfigCommon, which is used to inform the terminal of related configuration information of a newly added secondary carrier or secondary cell when the secondary carrier or the secondary cell is added (carrier aggregation or dual connectivity). The second dedicated signaling is for example MobilityControlInfo, which is used to inform the terminal of related configuration information of a target cell.

In an embodiment, the method further includes: receiving, by the terminal, resource scheduling information from the network device, and transmitting, by the terminal, uplink data according to the indication of the resource scheduling information.

In an embodiment, the method further includes: controlling, by the terminal, to perform a power back-off or lower a power class in a case that an uplink transmission by the terminal or an uplink transmission scheduled for the terminal exceeds an uplink transmission capability of the terminal during a second evaluation period. The terminal calculates a maximum output power configurable for the terminal in a serving cell based on a power after the power back-off is performed or the power class is lowered.

For example, the configurable maximum output power $P_{CMAX,f,c}$ is in a range:

$$P_{CMAX\_L,f,c} \leq P_{CMAX,f,c} \leq P_{CMAX\_H,f,c};$$

wherein, $P_{CMAX\_L,f,c}$ denotes the lower limit of the range, and is calculated according to the following formula:

$$P_{CMAX\_L,f,c} = \text{MIN}\{P_{EMAX,c} - \Delta T_{C,c}, (P_{PowerClass} - \Delta P_{PowerClass}) - \text{additional power back-off and insertion loss}\};$$

wherein, $(P_{EMAX,c} - \Delta T_{C,c})$ denotes the maximum output power allowed in the network, $((P_{PowerClass} - \Delta P_{PowerClass}) -$ additional power back-off and insertion loss) denotes the maximum output power actually attainable by the terminal, and $(P_{PowerClass} - \Delta P_{PowerClass})$ denotes the terminal power after the power back-off is performed or the power class is lowered;

wherein, $P_{CMAX\_H,f,c}$ denotes the higher limit of the range, and is calculated according to the following formula:

$$P_{CMAX\_H,f,c} = \text{MIN}\{P_{EMAX,c}, P_{PowerClass} - \Delta P_{PowerClass}\};$$

wherein, $P_{EMAX,c}$ denotes the maximum output power allowed in the network, and $(P_{PowerClass} - \Delta P_{PowerClass})$ denotes the terminal power after the power back-off is performed or the power class is lowered.

In an embodiment, the method further includes: transmitting, by the terminal, updated fifth indication information to the network device, wherein the updated fifth indication information includes an updated maximum transmission power or power class for assisting the network device to make a scheduling decision.

According to the technical solution of embodiments of the present disclosure, the terminal reports the power class type for the band combination and/or the capability corresponding to the band combination, so that the network device may acquire the power class type for the band combination and/or the capability corresponding to the band combination of the terminal, and properly schedule the uplink transmission by the terminal according to the acquired information under the condition that the required electromagnetic radiation SAR limit is met. The technical solution is particularly applicable to a cross-band, cross-RAT aggregation scenario.

Figure 2:
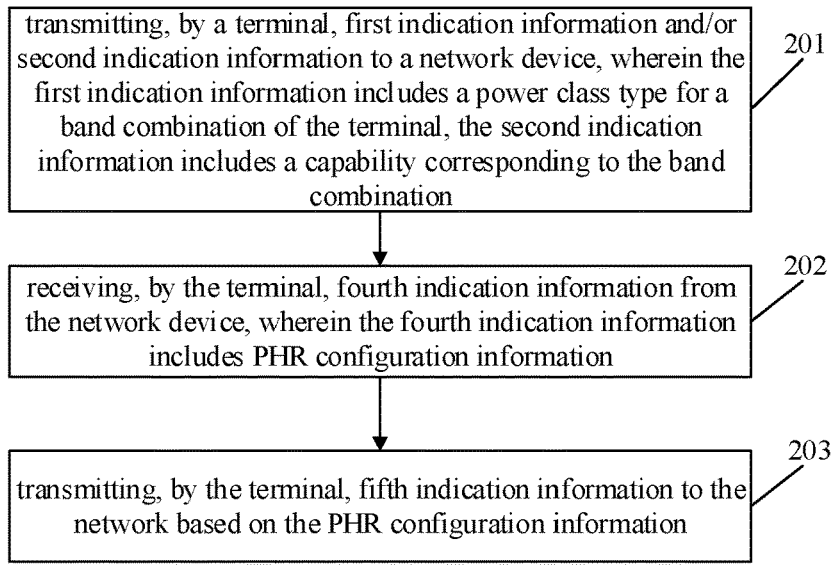
FIG. 2 is a second flow diagram of a resource allocation method according to an embodiment of the present disclosure.

An embodiment of the present disclosure further provides a resource allocation method. FIG. 2 is a second flow diagram of the resource allocation method according to the embodiment of the present disclosure. As shown in FIG. 2, the method includes a step 201, a step 202 and a step 203.

Step 201: transmitting, by a terminal, first indication information and/or second indication information to a network device, wherein the first indication information includes a power class type for a band combination of the terminal, the second indication information includes a capability corresponding to the band combination.

Step 202: receiving, by the terminal, fourth indication information from the network device, wherein the fourth indication information includes power headroom report (PHR) configuration information, the PHR configuration information includes PHR report configuration information for a case where the terminal has an inter-RAT dual connectivity, or includes PHR report configuration information for a case where the terminal has a carrier aggregation, dual connectivity.

Step 203: transmitting, by the terminal, fifth indication information to the network based on the PHR configuration information, wherein the fifth indication information includes a PHR for the band combination of the terminal.

For a description of the step 201 in the embodiment, a reference may be made to the description related to the step 101 in the foregoing embodiment, and a detail description thereof is omitted herein.

In this implementation, the PHR report configuration information for a case where the terminal has a multi-RAT dual connectivity includes at least one of following configuration information: whether to report a PHR for an LTE network to the LTE network; whether to report a PHR for an NR network to the NR network; whether to report a PHR for an NR network to an LTE network; whether to report a PHR for an LTE network to an NR network.

In this implementation, the PHR included by the fifth indication information includes at least one of: a PHR for an LTE network reported to the LTE network; a PHR for an NR network reported to the NR network; a PHR for an NR network reported to an LTE network; a PHR for an LTE network reported to an NR network.

In an embodiment, the method further includes: receiving, by the terminal, resource scheduling information from the network device, and transmitting, by the terminal, uplink data according to the indication of the resource scheduling information.

In an embodiment, the method further includes: controlling, by the terminal, to perform a power back-off or lower a power class in a case that an uplink transmission by the terminal or an uplink transmission scheduled for the terminal exceeds an uplink transmission capability of the terminal during a second evaluation period. Further, the terminal calculates a maximum output power configurable for the terminal in a serving cell based on a power after the power back-off is performed or the power class is lowered.

In an embodiment, the method further includes: transmitting, by the terminal, updated fifth indication information to the network device, wherein the updated fifth indication information includes an updated maximum transmission power or power class for assisting the network device to make a scheduling decision.

According to the technical solution of embodiments of the present disclosure, on the one hand, the terminal reports the power class type for the band combination and/or the capability corresponding to the band combination, so that the network device may acquire the power class type for the band combination and/or the capability corresponding to the band combination of the terminal, and properly schedule the uplink transmission for the terminal according to the acquired information under the condition that the required electromagnetic radiation SAR limit is met. The technical solution is particularly applicable to a cross-band, cross-RAT aggregation scenario. On the other hand, the terminal may satisfy the electromagnetic SAR requirement by performing power back-off or lowering power class, thus the technical solution is applicable to more services.

Figure 3:
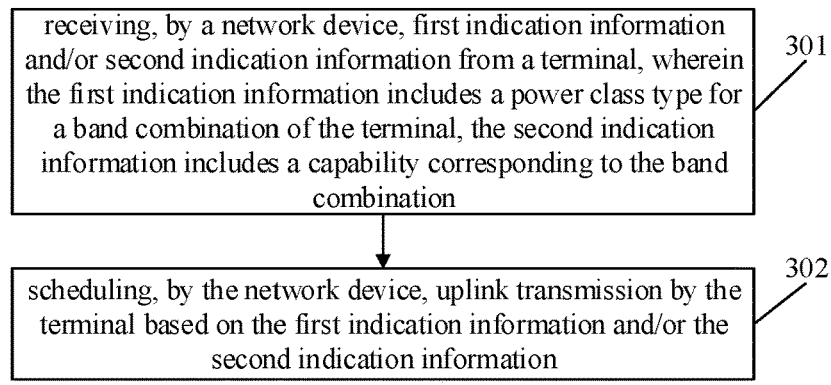
FIG. 3 is a third flow diagram of a resource allocation method according to an embodiment of the present disclosure.

An embodiment of the present disclosure further provides a resource allocation method. FIG. 3 is a third flow diagram of the resource allocation method according to the embodiment of the present disclosure. As shown in FIG. 3, the method includes a step 301 and a step 302.

Step 301: receiving, by a network device, first indication information and/or second indication information from a terminal, wherein the first indication information includes a power class type for a band combination of the terminal, the second indication information includes a capability corresponding to the band combination.

Step 302: scheduling, by the network device, uplink transmission by the terminal based on the first indication information and/or the second indication information.

For a description of the first and second indication information in this embodiment, a reference may be made to the description related to the first and second indication information in the foregoing embodiment, and a detail description thereof is omitted herein.

In this embodiment, the network device may schedule uplink transmission by the terminal based on the first indication information and/or the second indication information reported by the terminal.

Figure 4:
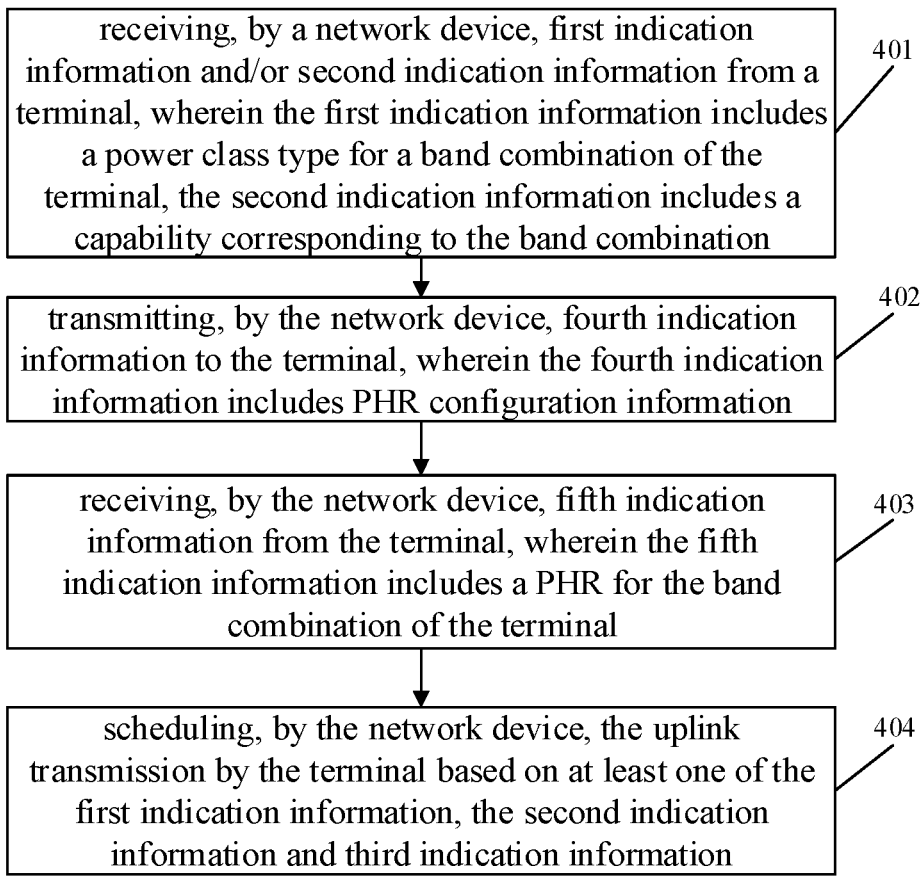
FIG. 4 is a fourth flow diagram of a resource allocation method according to an embodiment of the present disclosure.

An embodiment of the present disclosure further provides a resource allocation method. FIG. 4 is a fourth flow diagram of the resource allocation method according to the embodiment of the present disclosure. As shown in FIG. 4, the method includes a step 401, a step 402, a step 403 and a step 404.

Step 401: receiving, by a network device, first indication information and/or second indication information from a terminal, wherein the first indication information includes a power class type for a band combination of the terminal, the second indication information includes a capability corresponding to the band combination.

Step 402: transmitting, by the network device, fourth indication information to the terminal, wherein the fourth indication information includes PHR configuration information, the PHR configuration information includes PHR report configuration information for a case where the terminal has an inter-RAT dual connectivity, or includes PHR report configuration information for a case where the terminal has a carrier aggregation, dual connectivity.

Step 403: receiving, by the network device, fifth indication information from the terminal, wherein the fifth indication information includes a PHR for the band combination of the terminal.

Step 404: scheduling, by the network device, the uplink transmission by the terminal based on at least one of the first indication information, the second indication information and third indication information.

For a description of the first and second indication information in this embodiment, a reference may be made to the description related to the first and second indication information in the foregoing embodiment, and a detail description thereof is omitted herein.

As an implementation, the PHR configuration information includes PHR report configuration in a CA or DC scenario, for example, the network indicates that PHRs for a PSCell and an SCell are to be reported.

As another implementation, the PHR report configuration information for a case where the terminal has a multi-RAT dual connectivity includes at least one of following configuration information: whether to report a PHR for an LTE network to the LTE network; whether to report a PHR for an NR network to the NR network; whether to report a PHR for an NR network to an LTE network; whether to report a PHR for an LTE network to an NR network.

In this implementation, the PHR included by the fifth indication information includes at least one of: a PHR for an LTE network reported to the LTE network; a PHR for an NR network reported to the NR network; a PHR for an NR network reported to an LTE network; a PHR for an LTE network reported to an NR network.

In this implementation, the network device schedules uplink transmission by the terminal based on at least one of the first indication information, the second indication information and the third indication information. For example, a second cell (e.g., NR) may make a scheduling decision based on the PHR reported by the terminal, to schedule the terminal's uplink transmission. For example, in a case that a transmission power of the terminal for a first cell (e.g., LTE) decreases, more uplink resources may be scheduled in a second cell (e.g., NR) or a transmission power for the second cell may be increased.

According to the technical solution of embodiments of the present disclosure, on the one hand, the terminal reports the power class type for the band combination and/or the capability corresponding to the band combination, so that the network device may acquire the power class type for the band combination and/or the capability corresponding to the band combination of the terminal, and properly schedule the uplink transmission by the terminal according to the acquired information under the condition that the required electromagnetic radiation SAR limit is met. The technical solution is particularly applicable to a cross-band, cross-RAT aggregation scenario. On the other hand, the terminal may satisfy the electromagnetic SAR requirement by performing power back-off or lowering power class, thus the technical solution is applicable to more services.

Figure 5:
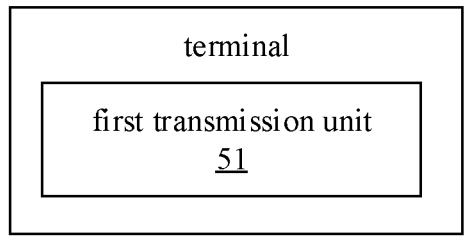
FIG. 5 is a schematic structural diagram of a terminal according to an embodiment of the present disclosure.

An embodiment of the present disclosure further provides a terminal. FIG. 5 is a schematic structural diagram of the terminal according to the embodiment of the present disclosure. As shown in FIG. 5, the terminal includes: a first transmission unit 51, configured to transmit first indication information and/or second indication information to a network device, wherein the first indication information includes a power class type for a band combination of the terminal, the second indication information includes a capability corresponding to the band combination.

In the embodiment, the band combination of the terminal includes supporting at least one of: a carrier aggregation, a dual connectivity, a multi-RAT dual connectivity, an SUL. The multi-RAT dual connectivity is an EN-DC.

In the embodiment, the second indication information includes at least one of following information for the band combination under a condition that a required electromagnetic radiation specific absorption percentage (SAR) limit is met:

an overall maximum percentage of uplink that can be scheduled for uplink transmission during a first evaluation period;

a combination of percentages of uplink that can be scheduled or transmitted during a first evaluation period;

the combination of percentages of uplink that can be scheduled or transmitted during a first evaluation period and a granularity of the percentage of uplink;

an identifier of the combination of percentages of uplink that can be scheduled or transmitted during a first evaluation period;

a combination of maximum percentages of uplink that can be scheduled or transmitted during a first evaluation period;

the combination of the percentage of uplink that can be scheduled or transmitted during a first evaluation period on a secondary carrier or a second RAT carrier in a case that a TDD uplink-downlink configuration is one of 0 to 6 configurations for a primary carrier or a first RAT or FDD;

the combination of the percentage of uplink that can be scheduled or transmitted during a first evaluation period on the secondary carrier or the second RAT carrier in the case that the TDD uplink-downlink configuration is one of 0 to 6 configurations for the primary carrier or the first RAT or FDD and a granularity of the percentage of uplink;

an identifier of the combination of the percentage of uplink that can be scheduled or transmitted during a first evaluation period on the secondary carrier or the second RAT carrier in the case that the TDD uplink-downlink configuration is one of 0 to 6 configurations for the primary carrier or the first RAT or FDD;

a maximum percentage of uplink that can be scheduled or transmitted during a first evaluation period on the secondary carrier or the second RAT carrier in the case that the TDD uplink-downlink configuration is one of 0 to 6 configurations for the primary carrier or the first RAT or FDD;

a maximum percentage of uplink that can be scheduled or transmitted during a first evaluation period on the secondary carrier or the second RAT carrier in the case that the TDD uplink-downlink configuration is 1 for the primary carrier or the first RAT or FDD;

a maximum percentage of uplink that can be scheduled or transmitted during a first evaluation period on the secondary carrier or the second RAT carrier in the case that the TDD uplink-downlink configuration is neither 0 nor 6 for the primary carrier or the first RAT or FDD;

a maximum percentage of uplink that can be scheduled or transmitted during a first evaluation period on the secondary carrier or the second RAT carrier in a case that the terminal has a TDD first uplink-downlink configuration for the primary carrier or the first RAT.

the combination of percentages of uplink indicates whether uplink percentages of aggregated carriers in the band combination are supported under the condition that the required electromagnetic radiation SAR limit is met; the granularity of the percentage of uplink indicates a percentage interval between uplink percentages of an aggregated carrier in the band combination; the identifier of the combination of percentages of uplink indicates an identifier of information corresponding to the combination of percentages of uplink, wherein the information corresponding to the combination of percentages of uplink is preconfigured in the terminal.

Figure 6:
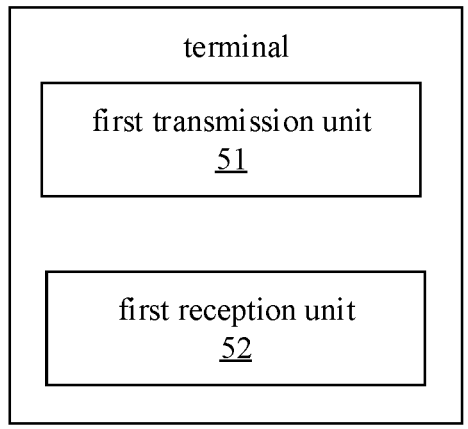
FIG. 6 is another schematic structural diagram of a terminal according to an embodiment of the present disclosure.

In an embodiment, as shown in FIG. 6, the terminal further includes a first reception unit 52, configured to receive third indication information from the network device, wherein the third indication information includes uplink-downlink configuration information.

In the embodiment, a maximum percentage of uplink that can be scheduled or transmitted during a first evaluation period in NR is determined based on the uplink-downlink configuration information.

In the embodiment, the uplink-downlink configuration information includes:

uplink-downlink configuration information of at least one primary carrier or first RAT cell and uplink-downlink configuration information of at least one secondary carrier or second RAT cell in a case that the terminal has a multi-RAT dual connectivity; or, uplink-downlink configuration information of at least two carriers or cells in a case that the terminal has a carrier aggregation, a dual connectivity or an SUL.

As an implementation, the first reception unit 52 is configured to receive broadcast information carrying the third indication information, or receive dedicated signaling carrying the third indication information.

Here, the first reception unit 52 is configured to: receive first dedicated signaling carrying the third indication information, wherein the third indication information is used to inform the terminal of uplink-downlink configuration information of a newly added secondary carrier or secondary cell; or, receive second dedicated signaling carrying the third indication information, wherein the third indication information is used to inform the terminal of uplink-downlink configuration information of a handover target cell.

Figure 7:
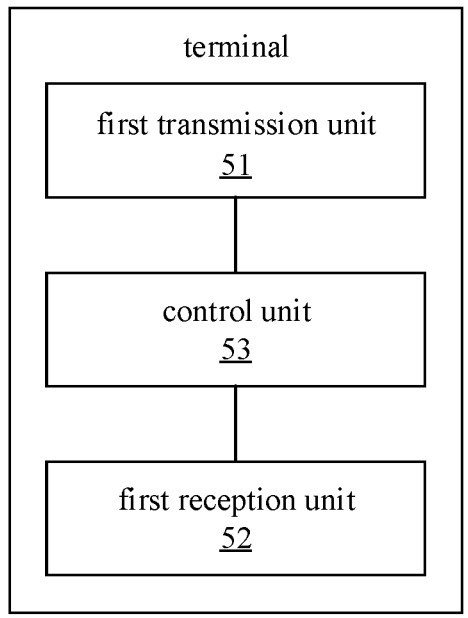
FIG. 7 is yet another schematic structural diagram of a terminal according to an embodiment of the present disclosure.

In an embodiment, as shown in FIG. 7, the terminal further includes a control unit 53 configured to: control to perform a power back-off or lower a power class in a case that an uplink transmission by the terminal or an uplink transmission scheduled for the terminal exceeds an uplink transmission capability of the terminal during a second evaluation period.

In an embodiment, the control unit 53 is further configured to: calculate a maximum output power configurable for the terminal in a serving cell based on a power after the power back-off is performed or the power class is lowered.

In the embodiment, the first transmission unit 51 is further configured to: transmit updated fifth indication information to the network device, wherein the updated fifth indication information includes an updated maximum transmission power or power class.

An embodiment of the present disclosure further provides a terminal, as shown in FIG. 6, the terminal includes: a first transmission unit 51 and a first reception unit 52.

The first transmission unit 51 is configured to transmit first indication information and/or second indication information to a network device, wherein the first indication information includes a power class type for a band combination of the terminal, the second indication information includes a capability corresponding to the band combination.

The first reception unit 52 is configured to: receive fourth indication information from the network device, wherein the fourth indication information includes PHR configuration information, the PHR configuration information includes PHR report configuration information for a case where the terminal has an inter-RAT dual connectivity, or includes PHR report configuration information for a case where the terminal has a carrier aggregation, dual connectivity.

The first transmission unit 51 is further configured to transmit fifth indication information to a network based on the PHR configuration information, wherein the fifth indication information includes a PHR for the band combination of the terminal.

In the embodiment, the PHR report configuration information for a case where the terminal has a multi-RAT dual connectivity includes at least one of following configuration information: whether to report a PHR for an LTE network to the LTE network; whether to report a PHR for an NR network to the NR network; whether to report a PHR for an NR network to an LTE network; whether to report a PHR for an LTE network to an NR network.

In the embodiment, the PHR included by the fifth indication information includes at least one of: a PHR for an LTE network reported to the LTE network; a PHR for an NR network reported to the NR network; a PHR for an NR network reported to an LTE network; a PHR for an LTE network reported to an NR network.

In an embodiment, as shown in FIG. 7, the terminal further includes a control unit 53 configured to: control to perform a power back-off or lower a power class in a case that an uplink transmission by the terminal or an uplink transmission scheduled for the terminal exceeds an uplink transmission capability of the terminal during a second evaluation period.

In an embodiment, the control unit 53 is further configured to: calculate a maximum output power configurable for the terminal in a serving cell based on a power after the power back-off is performed or the power class is lowered.

In the embodiment, the first transmission unit 51 is further configured to: transmit updated fifth indication information to the network device, wherein the updated fifth indication information includes an updated maximum transmission power or power class.

In practical applications, the control unit 53 in the terminal in embodiments of the present disclosure may be implemented by a central processing unit (CPU), a digital signal processor (DSP), a microcontroller unit (MCU) or a field-programmable gate array (FPGA) in the terminal. In practical applications, the first transmission unit 51 and the first reception unit 52 in the terminal may be implemented by a communication module (including a basic communication suite, operating RAT, communication module, standardized interface, protocol, etc.) and a transmitting and receiving antenna.

An embodiment of the present disclosure further provides a terminal, including a memory, a processor and a computer program stored in the memory and configured to be executed by the processor, wherein the processor is configured to execute the computer program, to implement steps of the resource allocation method applied to the terminal as described in the foregoing embodiments of the present disclosure.

It is noted, the division of the program modules for implementing the resource allocation method provided in the foregoing embodiments is only exemplary, and in practical applications, the process can be assigned to different program modules for processing, that is, the internal structure of the terminal may be divided into different program modules to complete all or a part of the foregoing process. Moreover, the terminal provided in the foregoing embodiment and the resource allocation method embodiment pertain to the same idea. For a specific implementation of the terminal, a reference may be made to the method embodiment, and a detail description thereof is omitted herein.

Figure 8:
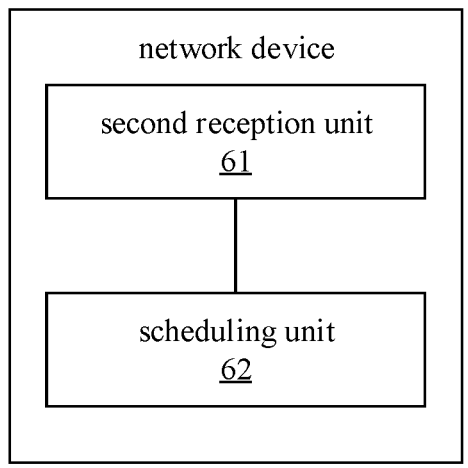
FIG. 8 is a schematic structural diagram of a network device according to an embodiment of the present disclosure.

An embodiment of the present disclosure further provides a network device. FIG. 8 is a schematic structural diagram of the network device according to the embodiment of the present disclosure. As shown in FIG. 8, the network device includes a second reception unit 61 and a scheduling unit 62.

The second reception unit 61 is configured to receive first indication information and/or second indication information from a terminal, wherein the first indication information includes a power class type for a band combination of the terminal, the second indication information includes a capability corresponding to the band combination; the scheduling unit 62 is configured to schedule uplink transmission by the terminal based on the first indication information and/or the second indication information.

In the embodiment, the band combination of the terminal includes supporting at least one of: a carrier aggregation, a dual connectivity, a multi-RAT dual connectivity, an SUL.

The multi-RAT dual connectivity is an EN-DC.

In the embodiment, the second indication information includes at least one of following information for the band combination under a condition that a required electromagnetic radiation specific absorption percentage (SAR) limit is met:

an overall maximum percentage of uplink that can be scheduled for uplink transmission during a first evaluation period;

a combination of percentages of uplink that can be scheduled or transmitted during a first evaluation period;

the combination of percentages of uplink that can be scheduled or transmitted during a first evaluation period and a granularity of the percentage of uplink;

an identifier of the combination of percentages of uplink that can be scheduled or transmitted during a first evaluation period;

a combination of maximum percentages of uplink that can be scheduled or transmitted during a first evaluation period;

the combination of the percentage of uplink that can be scheduled or transmitted during a first evaluation period on a secondary carrier or a second RAT carrier in a case that a TDD uplink-downlink configuration is one of 0 to 6 configurations for a primary carrier or a first RAT or FDD;

the combination of the percentage of uplink that can be scheduled or transmitted during a first evaluation period on the secondary carrier or the second RAT carrier in the case that the TDD uplink-downlink configuration is one of 0 to 6 configurations for the primary carrier or the first RAT or FDD and a granularity of the percentage of uplink;

an identifier of the combination of the percentage of uplink that can be scheduled or transmitted during a first evaluation period on the secondary carrier or the second RAT carrier in the case that the TDD uplink-downlink configuration is one of 0 to 6 configurations for the primary carrier or the first RAT or FDD;

a maximum percentage of uplink that can be scheduled or transmitted during a first evaluation period on the secondary carrier or the second RAT carrier in the case that the TDD uplink-downlink configuration is one of 0 to 6 configurations for the primary carrier or the first RAT or FDD;

a maximum percentage of uplink that can be scheduled or transmitted during a first evaluation period on the secondary carrier or the second RAT carrier in the case that the TDD uplink-downlink configuration is 1 for the primary carrier or the first RAT or FDD;

a maximum percentage of uplink that can be scheduled or transmitted during a first evaluation period on the secondary carrier or the second RAT carrier in the case that the TDD uplink-downlink configuration is neither 0 nor 6 for the primary carrier or the first RAT or FDD;

a maximum percentage of uplink that can be scheduled or transmitted during a first evaluation period on the secondary carrier or the second RAT carrier in a case that the terminal has a TDD first uplink-downlink configuration for the primary carrier or the first RAT.

the combination of percentages of uplink indicates whether uplink percentages of aggregated carriers in the band combination are supported under the condition that the required electromagnetic radiation SAR limit is met; the granularity of the percentage of uplink indicates a percentage interval between uplink percentages of an aggregated carrier in the band combination; the identifier of the combination of percentages of uplink indicates an identifier of information corresponding to the combination of percentages of uplink, wherein the information corresponding to the combination of percentages of uplink is preconfigured in the terminal.

Figure 9:
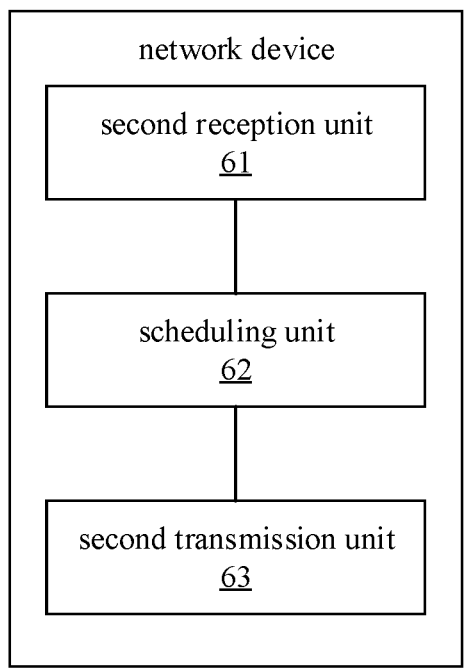
FIG. 9 is another schematic structural diagram of a network device according to an embodiment of the present disclosure.

In an embodiment, as shown in FIG. 9, the network device further includes a second transmission unit 63, configured to transmit third indication information to the terminal, wherein the third indication information includes uplink-downlink slot configuration information.

Here, the second transmission unit 63 is configured to: transmit the third indication information to the terminal via broadcast information; or, transmit the third indication information to the terminal via dedicated signaling.

As an example, the second transmission unit 63 is configured to: transmit the third indication information to the terminal via first dedicated signaling, wherein the third indication information is used to inform the terminal of uplink-downlink configuration information of a newly added secondary carrier or secondary cell; or, transmit the third indication information to the terminal via second dedicated signaling, wherein the third indication information is used to inform the terminal of uplink-downlink configuration information of a handover target cell.

The uplink-downlink slot configuration information includes: uplink-downlink configuration information of at least one primary carrier or first RAT cell and uplink-downlink slot configuration information of at least one secondary carrier or second RAT cell in a case that the terminal has a multi-RAT dual connectivity; or, uplink-downlink configuration information of at least two carriers or cells in a case that the terminal has a carrier aggregation, a dual connectivity or an SUL.

An embodiment of the present disclosure further provides a network device. As shown in FIG. 9, the network device includes a second reception unit 61, a second transmission unit 63 and a scheduling unit 62.

The second reception unit 61 is configured to receive first indication information and/or second indication information from a terminal, wherein the first indication information includes a power class type for a band combination of the terminal, the second indication information includes a capability corresponding to the band combination.

The second transmission unit 63 is configured to transmit fourth indication information to the terminal, wherein the fourth indication information includes PHR configuration information, the PHR configuration information includes PHR report configuration information for a case where the terminal has an inter-RAT dual connectivity, or includes PHR report configuration information for a case where the terminal has a carrier aggregation, dual connectivity.

The second reception unit 61 is further configured to receive fifth indication information from the terminal, wherein the fifth indication information includes a PHR for the band combination of the terminal.

The scheduling unit 62 is configured to schedule the uplink transmission by the terminal based on at least one of the first indication information, the second indication information and the third indication information.

Here, the PHR report configuration information for a case where the terminal has an inter-RAT dual connectivity includes at least one of following configuration information: whether to report a PHR for an LTE network to the LTE network; whether to report a PHR for an NR network to the NR network; whether to report a PHR for an NR network to an LTE network; whether to report a PHR for an LTE network to an NR network.

In the embodiment, the scheduling unit 62 is configured to: allocate an uplink resource to the terminal based on at least one of the first indication information, the second indication information and the third indication information, and transmit resource scheduling information of the uplink resource to the terminal.

In an embodiment, the second transmission unit 63 is further configured to transmit third indication information to the terminal, wherein the third indication information includes uplink-downlink slot configuration information.

Here, the second transmission unit 63 is configured to: transmit the third indication information to the terminal via broadcast information; or, transmit the third indication information to the terminal via dedicated signaling.

As an example, the second transmission unit 63 is configured to: transmit the third indication information to the terminal via first dedicated signaling, wherein the third indication information is used to inform the terminal of uplink-downlink configuration information of a newly added secondary carrier or secondary cell; or, transmit the third indication information to the terminal via second dedicated signaling, wherein the third indication information is used to inform the terminal of uplink-downlink configuration information of a handover target cell.

The uplink-downlink slot configuration information includes: uplink-downlink configuration information of at least one primary carrier or first RAT cell and uplink-downlink slot configuration information of at least one secondary carrier or second RAT cell in a case that the terminal has a multi-RAT dual connectivity; or, uplink-downlink configuration information of at least two carriers or cells in a case that the terminal has a carrier aggregation, a dual connectivity or an SUL.

An embodiment of the present disclosure further provides a network device, including a memory, a processor and a computer program stored in the memory and configured to be executed by the processor, wherein the processor is configured to execute the computer program, to implement steps of the resource allocation method applied to the network device as described in the foregoing embodiments of the present disclosure.

In practical applications, the scheduling unit 62 in the network device in embodiments of the present disclosure may be implemented by a CPU, a DSP, an MCU or an FPGA in the network device. In practical applications, the second reception unit 61 and the second transmission unit 63 in the network device may be implemented by a communication module (including a basic communication suite, operating RAT, communication module, standardized interface, protocol, etc.) and a transmitting and receiving antenna.

It is noted, the division of the program modules for implementing the resource allocation method provided in the foregoing embodiments is only exemplary, and in practical applications, the process can be assigned to different program modules for processing, that is, the internal structure of the network device may be divided into different program modules to complete all or a part of the foregoing process. Moreover, the network device provided in the foregoing embodiment and the resource allocation method embodiment pertain to the same idea. For a specific implementation of the network device, a reference may be made to the method embodiment, and a detail description thereof is omitted herein.

In the embodiments of the present disclosure, the memory may be implemented by any type of volatile memory or non-volatile memory or a combination thereof. The non-volatile memory may be a read only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, an optical disc or a compact disc read-only memory (CD-ROM). The magnetic surface memory may be a magnetic disk or a magnetic tape. The volatile memory may be a random access memory (RAM) and is used as an external cache. By way of example and without any limitation, various forms of RAMs are available, such as a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), an synch link dynamic random access memory (SLDRAM), and a direct Rambus random access memory (DRRAM). The memory described in the embodiments of the present disclosure is intended to include, without limitation, these and any other suitable types of memories.

It is understood, the foregoing methods disclosed in embodiments of the present disclosure may be applied to a processor or implemented by a processor. The processor may be an integrated circuit chip having a signal processing capability. During implementation, the steps in the foregoing methods may be accomplished by hardware integrated logic circuits or instructions in a software form in the processor. The processor may be a general-purpose processor, a DSP, or other programmable logic device, discrete gate or transistor logic device, a discrete hardware component and the like. The processor can implement or execute the methods, steps, and logic block diagrams disclosed in embodiments of the present disclosure. The general-purpose processor may be a microprocessor or any conventional processor or the like. The steps of the methods disclosed with reference to the embodiments of the present disclosure may be directly performed and accomplished by a hardware decoding processor, or performed and accomplished by a combination of hardware and software modules in a decoding processor. The software modules may reside in a storage medium, and the storage medium resides in a memory. The processor reads information from the memory and accomplishes the steps in the foregoing methods using its hardware.

An embodiment of the present disclosure further provides a computer readable storage medium storing therein a computer program, wherein the computer program is configured to be executed by a processor, to implement steps of the resource allocation method applied to the terminal as described in the foregoing embodiment of the present disclosure, or to implement steps of the resource allocation method applied to the network device as described in the foregoing embodiment of the present disclosure.

In several embodiments provided in the present application, it should be understood that the disclosed devices and methods may be implemented in other manners. For example, the described device embodiment is merely exemplary. For example, the unit division is merely logical function division and may be other division in actual implementation. For example, a plurality of units or components may be combined or integrated into another RAT, or some features may be ignored or not performed. In addition, the displayed or discussed mutual couplings or direct couplings or communication connections between various components may be implemented through some interfaces. The indirect couplings or communication connections between the devices or units may be implemented in electric, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in hardware form or implemented in form of a combination of hardware and software functional unit.

Those of ordinary skill in the art would appreciate that all or some of the steps of the foregoing method embodiments may be accomplished with hardware associated with program instructions. The program may be stored in a computer readable storage medium, and the steps of the foregoing method embodiments are performed when the program is executed. The storage medium includes various media capable of storing program codes, such as a removable storage device, ROM, RAM, magnetic disk or optical disc.

If the integrated unit of the present disclosure is implemented in the form of a software functional module, and sold or used as a standalone product, the product may be stored in a computer-readable storage medium. Based on such an understanding, essential parts, or parts contributing to the related art, of the technical solution of the embodiments of the present disclosure may be implemented in form of a software product. The software product is stored in a storage medium and includes several instructions configured to be executed by a computer device (which may be a personal computer, a server, a network device or the like) to perform all or a part of the methods according to the embodiments of the present disclosure. The storage medium includes various media capable of storing program codes, such as a removable storage device, ROM, RAM, magnetic disk or optical disc.

The aforementioned are merely specific implementations of the present disclosure, and the scope of the disclosure is by no means limited thereto. Any modifications or replacements that would easily occurred to those skilled in the art, without departing from the technical scope disclosed in the disclosure, should be encompassed in the scope of the present disclosure. Therefore, the scope of the present disclosure is to be determined by the scope of the claims.

What is claimed is:

1. A resource allocation method, comprising:
    transmitting, by a terminal, first indication information and second indication information to a network device,
    wherein the first indication information comprises a power class type for a band combination of the terminal, the second indication information comprises a capability corresponding to the band combination;
    wherein the second indication information meets SAR requirements, and the second indication information comprises the following information for the band combination:
    a maximum percentage of uplink that can be scheduled or transmitted during a first evaluation period on the secondary carrier or the second RAT carrier in the case that the TDD uplink-downlink configuration is one of 0 to 6 configurations for the primary carrier or the first RAT or FDD.

2. The resource allocation method according to claim 1, wherein the band combination of the terminal comprises supporting at least one of the following: carrier aggregation, dual connectivity, multi-RAT dual connectivity, supplementary uplink (SUL).

3. The resource allocation method according to claim 2, wherein the multi-RAT dual connectivity is a long term evolution (LTE)-new radio (NR) dual connectivity (EN-DC).

4. The resource allocation method according to claim 1, further comprising:
    receiving, by the terminal, third indication information from the network device, wherein the third indication information comprises uplink-downlink configuration information.

5. The resource allocation method according to claim 4, wherein a maximum percentage of uplink that can be scheduled or transmitted during a first evaluation period in new radio (NR) is determined based on the uplink-downlink configuration information.

6. The resource allocation method according to claim 4, wherein the uplink-downlink configuration information comprises:
    uplink-downlink configuration information of at least one primary carrier or first RAT cell and uplink-downlink configuration information of at least one secondary carrier or second RAT cell in a case that the terminal supports multi-RAT dual connectivity; or,
    uplink-downlink configuration information of at least two carriers or cells in a case that the terminal supports carrier aggregation, dual connectivity or SUL.

7. The resource allocation method according to claim 4, wherein the receiving, by the terminal, the third indication information from the network device comprises:
    receiving, by the terminal, broadcast information carrying the third indication information; or,
    receiving, by the terminal, dedicated signaling carrying the third indication information.

8. The resource allocation method according to claim 7, wherein the receiving, by the terminal, the dedicated signaling carrying the third indication information comprises:
    receiving, by the terminal, first dedicated signaling carrying the third indication information, wherein the third indication information is used to inform the terminal of uplink-downlink configuration information of a newly added secondary carrier or secondary cell; or,
    receiving, by the terminal, second dedicated signaling carrying the third indication information, wherein the third indication information is used to inform the terminal of uplink-downlink configuration information of a handover target cell.

9. The resource allocation method according to claim 1, further comprising:
receiving, by the terminal, fourth indication information from the network device, wherein the fourth indication information comprises power headroom report (PHR) configuration information,
the PHR configuration information comprises PHR report configuration information for a case where the terminal supports inter-RAT dual connectivity, or comprises PHR report configuration information for a case where the terminal supports carrier aggregation, dual connectivity.

10. The resource allocation method according to claim 9, further comprising:
transmitting, by the terminal, fifth indication information to a network based on the PHR configuration information, wherein the fifth indication information comprises a power headroom report (PHR) for the band combination of the terminal.

11. The resource allocation method according to claim 9, wherein the PHR report configuration information for a case where the terminal supports multi-RAT dual connectivity comprises at least one of following configuration information:
whether to report a PHR for an LTE network to the LTE network;
whether to report a PHR for an NR network to the NR network;
whether to report a PHR for an NR network to an LTE network;
whether to report a PHR for an LTE network to an NR network.

12. The resource allocation method according to claim 10, wherein the PHR comprised by the fifth indication information comprises at least one of:
a PHR for an LTE network reported to the LTE network;
a PHR for an NR network reported to the NR network;
a PHR for an NR network reported to an LTE network;
a PHR for an LTE network reported to an NR network.

13. The resource allocation method according to claim 1, further comprising:
controlling, by the terminal, to perform a power back-off or lower a power class in a case that an uplink transmission by the terminal or an uplink transmission scheduled for the terminal exceeds an uplink transmission capability of the terminal during a second evaluation period.

14. The resource allocation method according to claim 13, further comprising:
calculating, by the terminal, a maximum output power configurable for the terminal in a serving cell based on a power after the power back-off is performed or the power class is lowered.

15. The resource allocation method according to claim 4, wherein, the combination of percentages of uplink indicates whether uplink percentages of aggregated carriers in the band combination are supported so as to ensure compliance with electromagnetic radiation specific absorption ratio (SAR) requirements;
the granularity of the percentage of uplink indicates a percentage interval between uplink percentages of an aggregated carrier in the band combination;
the identifier of the combination of percentages of uplink indicates an identifier of information corresponding to the combination of percentages of uplink, wherein the information corresponding to the combination of percentages of uplink is preconfigured in the terminal.

16. A terminal, comprising a memory, a processor and a computer program stored in the memory and configured to be executed by the processor, wherein the processor is configured to execute the computer program, to implement steps of the method according to claim 1.

17. The resource allocation method according to claim 1, wherein the second indication information is indicated so as to ensure compliance with electromagnetic radiation specific absorption ratio (SAR) requirements.

18. The resource allocation method according to claim 1, wherein the second indication information comprises at least one of following information for the band combination:
an overall maximum percentage of uplink that can be scheduled for uplink transmission during a first evaluation period; or,
a combination of maximum percentages of uplink that can be scheduled or transmitted during a first evaluation period.

19. A resource allocation method, comprising:
receiving, by a network device, first indication information and/or second indication information from a terminal, wherein the first indication information comprises a power class type for a band combination of the terminal, the second indication information comprises a capability corresponding to the band combination;
scheduling, by the network device, uplink transmission by the terminal based on the first indication information and/or the second indication information;
wherein the second indication information meets SAR requirements, and the second indication information comprises the following information for the band combination:
a maximum percentage of uplink that can be scheduled or transmitted during a first evaluation period on the secondary carrier or the second RAT carrier in the case that the TDD uplink-downlink configuration is one of 0 to 6 configurations for the primary carrier or the first RAT or FDD.

20. A network device, comprising a memory, a processor and a computer program stored in the memory and configured to be executed by the processor, wherein the processor is configured to execute the computer program, to implement steps of the method according to claim 19.

* * * * *